March 1, 1932. E. F. BACON 1,848,053
ALTIMETER
Filed Sept. 6, 1929
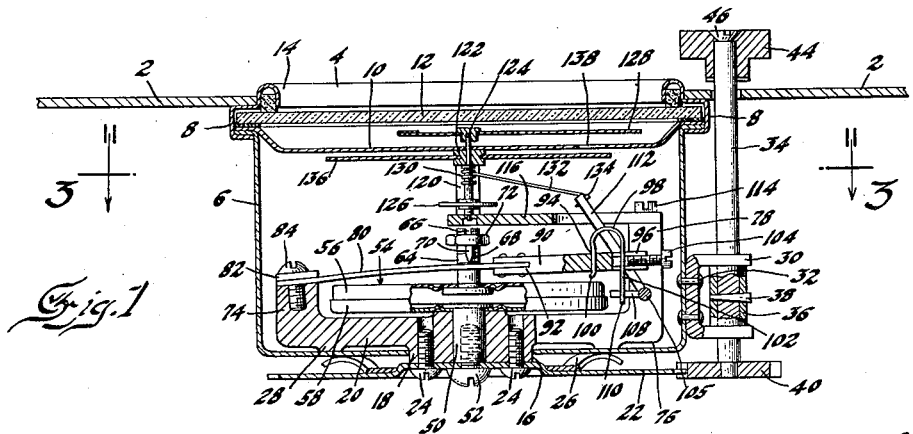
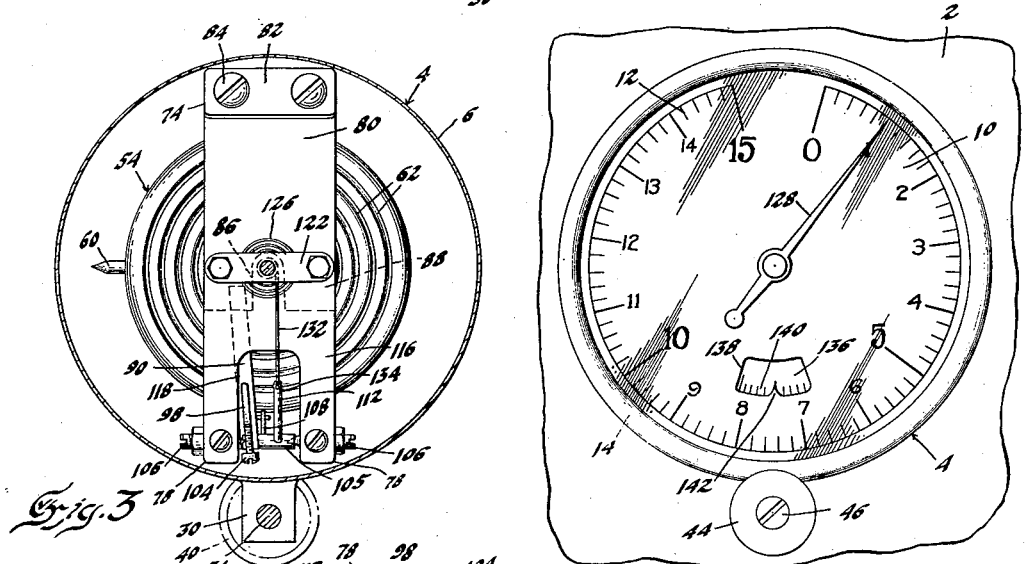
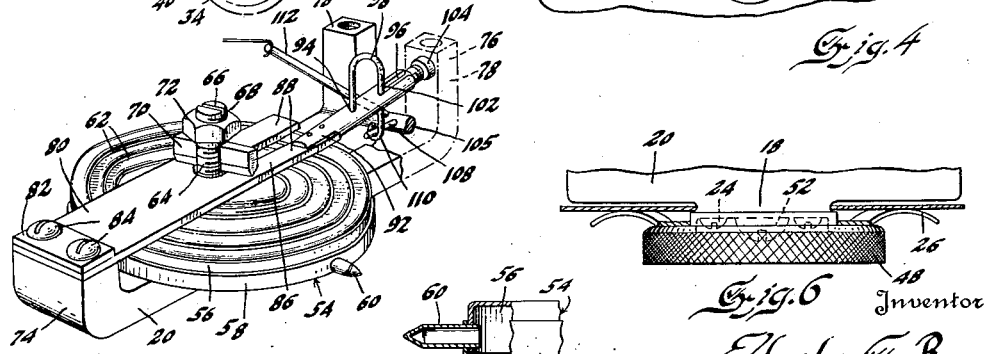
Inventor
Elbridge F. Bacon
By Blackmore, Spencer & Fish
Attorneys Patented Mar. 1, 1932

1,848,053

UNITED STATES PATENT OFFICE

ELBRIDGE F. BACON, OF FLINT, MICHIGAN, ASSIGNOR TO A C SPARK PLUG COMPANY, OF FLINT, MICHIGAN, A CORPORATION OF MICHIGAN

ALTIMETER

Application filed September 6, 1929. Serial No. 390,783.

This invention relates to indicating instruments and has particular reference to an altimeter or an instrument for indicating altitudes.

In prior constructions where a vacuum box has been employed, use almost invariably has been made of a spring of U or D shape to receive the movements due to the expansion or contraction of the vacuum box. Springs of this shape are objectionable in that the mechanism of the instrument is unable to receive the full benefit of the tangential movement of the end of an unformed spring. It is therefore one of the objects of the invention to construct an altimeter which uses an unbent or unformed and substantially straight spring having a free end. By the use of a straight and flat spring the expansion and contraction of the vacuum box is more directly and better transmitted to the operating mechanism of the instrument.

The instrument of the invention has its operating mechanism constructed without the use of gears but makes use of levers throughout to obtain the desired rotation of the pointer to register the altitude.

The altimeter of the invention is also provided with a stationary dial graduated to read in thousands of feet to indicate altitude, and a movable dial graduated to read in barometric pressures, the movable dial being mounted on the mechanism of the altimeter which is movable or rotatable within its casing. By rotating the mechanism and dial it is always possible to return the pointer to zero, or to any desired position on the stationary scale.

The altimeter of the invention comprises a casing or housing in the rear portion of which a suitable frame is rotatably mounted. The frame projects rearwardly of the casing and has mounted thereon a gear operated from a second gear having a handle which extends to the front of the casing and preferably through the instrument board on which the casing is mounted. By rotating the handle the frame and the parts mounted thereon may be rotated or adjusted at the will of the operator.

A suitable vacuum box is mounted on the frame concentrically with the casing. The inner side of the box has secured thereto a stud or post screw-threaded and split at its end. A knife-edge is mounted in the split and a nut applied to the threads to clamp the knife-edge in place.

A flat substantially straight spring is rigidly mounted at one end to the frame and extends over the diaphragm and has a forked or slotted end which extends on both sides of the post and has the knife-edge resting on the fork. A lever is secured to one of the forks and projects beyond the other side of the diaphragm between the tines of a forked end of the frame. The lever has a hook shaped spring-like member mounted in a pair of openings in its end. The outermost one of these openings is considerably larger than the cross section of the hook, and a screw, threaded into the end of the lever, abuts against the hook and by turning the screw inwardly or outwardly the position of the shank portion of the hook may be adjusted to calibrate the altimeter.

A shaft is turnably mounted between pilot screws extending through the forks of the U-shaped portion of the frame and a short arm on the shaft engages in an eye in the end of the shank portion of the hook. A second longer arm also secured to the shaft extends upwardly between the tines of the forked portion of the frame and away from the vacuum box and spring. As the vacuum box expands or contracts due to changes in atmospheric pressure the spring and vacuum box will unite to communicate their relative movements to the longer arm through the intermediary of the hook and shorter arm.

A forked plate mounted on the ends of the tines of the forked portion of the frame extends inwardly over the central portion of the altimeter and over the post of the vacuum box. At the end of the plate a pair of pillars are mounted which support a plate at the upper ends. Between the pillars and the two plates a pointer shaft is turnably mounted. The shaft has secured thereto one end of a hair spring the opposite end of which is attached to one of the pillars. A spirally grooved surface is also formed on the pointer shaft and a suitable thread or wire is wrapped about and secured at one end to the spiral groove, while its other end is secured to the upper portion of the longer arm which projects through the slotted portion of the supporting plate. A pointer is mounted in the usual way on the end of the pointer shaft and swings over a stationary dial held in the casing by the usual bezel.

The stationary dial is provided with an opening through which there is visible the scale of the second or movable dial, rigidly mounted on the plate supported on the pillars and adapted to turn or rotate with the supporting frame. The function of the two dials is to permit the adjustment of the pointer on the stationary dial relative to a definite altitude or elevation.

As a modification of the invention the frame may be rotated directly from the rear of the instrument by a suitable knurled knob.

On the drawings:

Fig. 1 is a transverse sectional view through the altimeter.

Fig. 2 is a perspective view on an enlarged scale, of a portion of the operating mechanism.

Fig. 3 is a section on the line 3—3 of Fig. 1.

Fig. 4 is a front view of the instrument showing the dials.

Fig. 5 is a detail view of the vacuum box and its exhaust connection.

Fig. 6 is a view of a modified form of rotating means.

Referring to the drawings, the numeral 2 indicates an instrument board such as that of an airplane. To the instrument board the altimeter 4 of the invention is applied. The altimeter has the outer casing or housing 6 flanged as at 8 at its outer end. Over this flange the stationary altitude dial 10 (graduated in thousands of feet) is seated and a glass 12 applied over the dial. A suitable bezel 14 holds the glass and dial in place.

The rear portion of the casing is provided with an opening 16 through which there extends the central boss 18 of a frame 20. A relatively large gear 22 is secured to the boss 18 by means of the screws 24 passing through openings in the depressed portion near the center of the gear and into the boss 18. A suitable spring 26 positioned between the gear 22 and the rear portion of the casing 6 holds the frame 20 tightly against the bottom of the casing 6. Suitable projecting portions 28 on the frame contact with the bottom of casing 6.

A U-shaped bracket 30 is secured to the side of the casing 6 by means of the rivets 32. A shaft 34 passes through openings in the arms of the U and is secured in place by means of a collar 36 (positioned between the arms of the U) and a tapered pin 38 which passes through both collar and shaft. A gear 40 is secured to the end of the shaft 34 and meshes with the gear 22. The shaft 34 extends through the instrument board 2 and has the knob or handle 44 secured to the end of the shaft by means of the screw 46. It will be obvious that by rotating the handle 44 the gears 40 and 22 will cause the rotation of the frame 20 for a purpose which later will be described.

Instead of the frame rotating mechanism as described, the structure shown in Fig. 6 may be used. In this figure, a knurled knob 48 is secured directly to the circular boss 18 by means of suitable screws 24, and the spring 26 is interposed between the knob and casing back. By turning the knob 48, the frame 20 may be suitably rotated.

The frame has an opening concentric with the boss 18 and in this opening there is adapted to be received the stud 50 provided with a screw threaded opening adapted to receive the machine screw 52 which passes through the depressed portion of the gear 22 and rigidly holds the stud 50 in place. On the inner portion of the stud there is rigidly mounted the vacuum box indicated as a whole at 54. This vacuum box comprises the upper member 56 and lower member 58, rigidly secured together in any suitable way in fluid tight relation. The vacuum box has an opening at one side in which a lead tube 60 is secured in airtight relation. After the vacuum box is exhausted by means of a suitable vacuum pump the tube 60 is pinched together and soldered shut to retain the efficiency of the vacuum in the box 54. The vacuum box preferably has its upper side 56 suitably corrugated as indicated at 62 in Fig. 3.

A post 64 is rigidly secured in fluid tight relation to the upper central portion of the upper member 56 of the vacuum box. The end of the post is slotted as indicated at 66 and screw threaded as at 68. The purpose of the slot 66 is to receive a knife-edge 70, while a nut 72 is applied to the screw threads and rigidly holds the knife-edge 70 in position. The knife-edge extends beyond the slot on both sides of the post.

The frame 20 has at one side the foot 74 and at its opposite side the forked portion 76 having the tines 78. A spring 80 is rigidly mounted at one end to the leg 74 by means of the plate 82 and the machine screws 84. The spring is relatively broad and straight and extends over and beyond the central portion of the vacuum box 54. The end of the spring is forked as indicated at 86 and has its tines 88 extending on either side of the post 64 and beneath the knife-edge 70. The knife edge connected to the vacuum box normally holds the spring 80 under tension so that it is slightly arched or curved. As the pressure decreases the vacuum box will expand and permit the post 64 and knife-edge 70 to raise, which will likewise permit the forks 88 of the spring to rise. An increase in atmospheric pressure will contract the vacuum box 54 and through the intermediary of the post and knife-edge will pull the tines 88 of the spring downward.

A lever 90 is secured at one end as at 92 to one of the tines 88 of the spring 80. Its opposite end is free and is provided with the opening 94 and the opening or slot 96 in which there is received the hook shaped member 98. The point 100 of the hook is received in the opening 94 while the shank portion 102 is received in the slot (or opening) 96. As is seen in Figs. 1 and 2, the slot 96 at its inner end is considerably larger than the cross section of the shank 102. A calibrating screw 104 is threaded into the end of the lever 90 and strikes against the shank 102 of the hook 98. By suitably turning the screw 104 either inwardly or outwardly, the shank 102 may be caused to move to secure an adjustment on the instrument.

A shaft 105 is journalled between the tines 78 of the fork 76 of the frame by means of the pilot screws 106. A short arm 108 is rigidly mounted on the shaft and is adapted to engage in an eye or U portion 110 at the end of the shank 102. A second longer arm 112 is also rigidly secured to the shaft 105 and extends well upwardly over the top of the tines 78.

A secondary or auxiliary supporting frame is mounted on the top of the tines 78 of the fork 76 by means of the machine screws 114. The secondary frame comprises the lower supporting plate 116 slotted as at 118 to allow for the passage of the arm 112 therethrough. The plate 116 extends well outwardly over the post 64 and has rigidly mounted on its end the pillars 120 which rigidly support a plate 122 on their upper ends. A pointer shaft 124 is journalled between the supporting plate 116 and the upper plate 122 and a hair spring 126 is secured at one end to the pointer shaft 124 and at its other end to one of the pillars 120 and always urges the pointer 128 (secured to the end of the shaft 124) toward zero position. The pointer shaft 124 has formed thereon a spiral groove 130 adapted to receive the thread or wire 132. One end of the thread or wire 132 is permanently attached to one end of the groove 130, while the opposite end is secured by means of a tapered pin 134 to the free end of the arm 112.

A dial 136 is rigidly mounted on the plate 122 as shown in Fig. 1.

As shown in Fig. 4 the stationary dial 10 is provided with the opening 138 through which the scale 140 of the dial 136 is visible. The dial 10 has formed thereon the pointer or index 142 which operates over the scale 140 of the dial 136.

In the operation of the altimeter the movement of the tines 88 of the spring 80 will be communicated by means of the lever 90 and hook 98 to the shorter arm 108 of the shaft 105. The longer arm 112 will be moved by the shaft 105 and pull the wire or string 132 from the spiral groove 130 to cause the rotation of the pointer shaft 124 to swing the pointer 128 over the dial 10.

The pointer 128 will directly indicate on the dial 10 elevations above any desired elevation, the vacuum box 54, of course varying with atmospheric or barometric pressures. Where sea level pressure is exerted on the vacuum box 54, the instrument is calibrated so that the pointer 128 will be at 0 while and the index 142 will be at 76 cm. (or 760 mm.).

In case it is desired to ascertain altitudes relative to a place which is above sea level, the stationary and movable dials 10 and 136 are available. By rotating the frame 20 and interconnected dial 136 the scale 140 of the dial 136 may be moved to cause the index 142 to register with the barometric pressure of the place of starting or destination. In case it is desired to go from a lower to a higher altitude, the pointer 128 will then register with zero on the scale 10 and will indicate directly the difference in elevation between the two points as the airplane travels toward its destination.

Should the airplane be moving from a place of higher elevation to one of lower elevation the scale 140 on the dial 136 will be set at the barometric pressure of the place of destination and the pointer 128 will then read the actual elevation of the starting point over the place of destination. As the plane moves from starting place to point of destination the pointer 128 will at all times directly indicate the elevation of the point of destination with reference to the airplane. When place of destination has been reached the pointer 128 will be at zero on the dial 10.

The graduation of the scales on dials 10 and 136 are of course made to correspond; in other words, a certain reading on one will always give the same definite reading on the other.

The instrument is useful in the case of aircraft equipped with radio and flying at night time from one city to another. The plane receives the barometric pressure of its destination and the pilot sets this barometric pressure on the barometric scale of the altimeter. The altitude scale then indicates the height above destination.

The instrument of the invention is also capable of use as a barometer.

The altimeter of the invention is operative regardless of the fact that barometric pressure is a variable. The variability of the barometric pressure is compensated with respect to the altitude scale due to the fact that the vacuum box 54 which operates the altitude pointer 128 is dependent on the barometric pressure.

I claim:

1. In an altimeter, a casing, a frame mounted in said casing, an expansible and contractible vacuum box permanently mounted relative to said frame, a substantially flat spring secured to said frame and extending over said box, a post secured to said box, a knife-edge member rigidly mounted relative to said post and contacting with said spring whereby the spring and box are adapted to transmit their movements to each other, a lever on the end of said spring, a hook secured to the end of said lever, a screw in said lever to change the position of said hook to calibrate the altimeter, and means operated from said hook to indicate the altitude.

2. In an altimeter, a casing, a frame rotatably mounted in said casing, means to rotate said frame, means mounted on said frame and adapted to be operated by changes in atmospheric pressure, a dial permanently mounted relative to said casing, said means having a pointer adapted to swing over said dial for indicating the altitude, a second dial rigidly mounted with reference to and adapted to turn with said frame and adapted for adjustment to indicate barometric pressures, said first dial having an opening showing the scale of the second dial, the adjustment of said frame and its dial permitting the pointer to return to zero on the non-movable scale, whereby direct altitude readings relative to a given altitude will be indicated on said non-movable dial.

In testimony whereof I affix my signature.

ELBRIDGE F. BACON.